(12) United States Patent
Garrison et al.

(10) Patent No.: US 7,958,460 B2
(45) Date of Patent: Jun. 7, 2011

(54) METHOD FOR PREDICTIVE DRAG AND DROP OPERATION TO IMPROVE ACCESSIBILITY (75) Inventors: John Michael Garrison, Austin, TX (US); Michael S. McKay, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 11/928,405

(22) Filed: Oct. 30, 2007

(65) Prior Publication Data

US 2009/0113330 A1 Apr. 30, 2009

(51) Int. Cl.
*G06F 3/048* (2006.01)

(52) U.S. Cl. ........ 715/812; 715/711; 715/707; 715/708; 715/705

(58) Field of Classification Search .................. 715/812, 715/711, 707, 708, 705
See application file for complete search history.

(56) References Cited

U.S. PATENT DOCUMENTS

| | | | |
|---|---|---|---|
| 5,999,178 A | 12/1999 | Hwang et al. | |
| 6,144,962 A * | 11/2000 | Weinberg et al. | 1/1 |
| 6,362,842 B1 * | 3/2002 | Tahara et al. | 715/856 |
| 2004/0095390 A1 | 5/2004 | Arning et al. | |

OTHER PUBLICATIONS

"Microsoft Windows User Experience," 1999, Microsoft Press, Chapter 5 and p. 108.*
V Kathlene Leonard, "An Exploratory Investigation of Handheld Computer Interaction for Older Adults with Visual Impairments", Assets'05 ACM 1-59593-159-7/05/0010; Oct. 2005; pp. 12-19.
Michael Beaudouin-Lafon, "Designing Interaction, not Interfaces", AVI'04, May 25, 2004; ACM 1-58113-867-9/04/0500; pp. 15-22.
Randy Pausch, Matthew Conway and Robert DeLine, "Lessons Learned from Suit, the Simple User Interface Toolkit", Computer Science Department, University of Virginia, Charlottesville, VA. ACM 1046-8188/92/1000-0320; ACM Transactions on Information Systems, vol. 10, No. 4, Oct. 1992, pp. 320-344.
Scott E. Hudson, Jennifer Mankoff and Ian Smith, "Extensible input Handling in the subArtic Toolkit", CHI 2005, Apr. 2, 2005, Portland, Oregon; ACM 1-58113-998-5/05/0004; pp. 381-390.

* cited by examiner

*Primary Examiner* — William L Bashore
*Assistant Examiner* — Daniel Um
(74) *Attorney, Agent, or Firm* — Jeff LaBaw; Darcell Walker (57) ABSTRACT

A method simplified drag and drop operations of display icons. This method calculates a projected path for an icon based on the past movement of the icon. The method highlights the "best fit" target icon as the mouse pointer moves across the screen. As the mouse pointer moves, or changes direction, the "best fit" target icon can change, with the current best-fit icon being highlighted. In addition to highlighting the target icon, a line or arrow from the mouse pointer to the target icon is maintained. The line presents the predicted path in a very noticeable, visual way. As the best-fit target icon changes, the line is re-drawn to point to the current best-fit icon. Regardless of how the target icon is visually indicated, releasing the mouse button will cause the drop operation to be completed "into" target. Completion of the drop could be instantaneous, or could be rendered with animation of some sort to indicate moving from the source to the target.

18 Claims, 7 Drawing Sheets

METHOD FOR PREDICTIVE DRAG AND DROP OPERATION TO IMPROVE ACCESSIBILITY

FIELD OF THE INVENTION

This invention relates to a method and system for moving and storing files in a computing environment and particular, this invention refers to a method and system for predicting a destination location for a file transfer during a drag and drop operation based on the dragging movement of a file toward a potential drop or file storage location.

BACKGROUND OF THE INVENTION

Computing technology experiences constant changes. Efforts are ongoing to develop technology that faster and more efficient. One aspect area technology designed to aid computer users is to have more functions that the user can perform with visual aids. One such visual aid in the computing world is the graphical user interface (GUI). A graphical user interface (GUI) is a type of user interface which allows people to interact with a computer and computer-controlled devices which employ graphical icons, visual indicators or special graphical elements called "widgets", along with text labels or text navigation to represent the information and actions available to a user. The actions are usually performed through direct manipulation of the graphical elements.

In graphical computing, a desktop environment (DE, sometimes desktop manager) offers a graphical user interface (GUI) to the computer. A DE typically provides icons, windows, toolbars, folders, wallpapers, and abilities like drag and drop. As a whole, the particularities of design and function of a desktop environment endow it with a distinctive look and feel. The desktop environments for the popular proprietary operating systems Microsoft Windows and Mac OS X are, in their intended use, relatively unalterable. This imposes a consistent user experience. However, there are alternative themes and third-party software that can completely change both the appearance of common interface elements (such as windows, buttons and icons) and the interface model itself. In Windows, this is accomplished by replacing the default Explorer shell. On systems running the X Window System (typically Unix-like systems), the desktop environment is much more flexible. In this context, a DE typically consists of a window manager (such as Metacity or KWin), a file manager (such as Konqueror or Nautilus), a set of themes, and programs and libraries for managing the desktop. All of these individual modules can be exchanged and individually configured to achieve a unique combination, but most desktop environments provide a default configuration that requires minimal user input.

In GUI environments, the mouse, which controls a cursor illustrated on the computer screen, is the primary instrument used to manipulate icons and issue commands. In addition, files are handled basically with the use of a mouse, and almost all operations can be performed with the mouse. In an operating system based on a GUI environment, for example, in Windows (trademark of Microsoft Corporation, U.S.A., registered in the United States and other countries), file handling by means of drag-and-drop is available.

In GUI environments, a drag and drop procedure is often implemented to transfer a file to particular folder. A drag and drop operation might require using a mouse to navigate significant real estate across the display (or even multiple displays). For example, dragging an icon from the lower right corner to an upper left trashcan might require moving the mouse several inches. For a person with limited mobility, this might be challenging. The problem can be even more significant when multiple displays are used to create a larger extended desktop (more mouse pointer movement is required).

A selected file may be dragged and dropped onto an icon of a folder on the desktop or in a file tree. Also, dropping the selected file onto an icon representing a folder permits the dragged file to be copied/moved to that folder. Although this drag and drop technique simplifies the transfer of files, this technique also involves risks such as a user having to navigate passed various desktop icons or the user accidentally dropping or transferring the file to the wrong folder.

Other attempts have been made to improve GUI technology with regard to navigating through a desktop. U.S. Pat. No. 6,362,842, to Tahara et al, describes an invention which displays a GUI picture, including an icon/window and a pointer (cursor) of a mouse or the like in a display screen of a computer. The invention predicts an icon, which the user is selecting, based on the moving speed and the direction of movement of the pointer. It displays a tool tip or the like which indicate the function of the icon. This invention also predicts an operation which the user is effecting on the window based on the moving speed of the pointer and a distance between the pointer and a window, changes the display of the pointer from a conventional arrow head during the movement to a bidirectional arrow head appearing in changing the size of the window, for example, depending on the prediction, and further assists an operation to change the size of the window in response to clicking by the user.

U.S. Patent application 20040095390 to Andreas Arning et al, describes a method of performing a drag-and-drop operation of an object onto a container of a set of containers. The method comprises selecting the object, dragging and dropping of the selected object onto a first container of the set of containers and predicting a second container of the set of containers to which the object is assigned. If the second container is different from the first object, outputting of a warning signal.

Although some techniques exist related to predicting the selection of the icons on a desktop, there remains a need for a method and system that predicts the drop location of a file or icon during a dragging operation.

SUMMARY OF THE INVENTION

In the present invention, when an icon dragging operation is started, there is a determination of the direction of the drag or moving icon. From the direction of the dragging movement, there is a prediction of the path of the drag icon and an identification of the icon(s) that is closest to this predicted drag path. This identified icon is viewed as a potential target or drop icon. The identified drop icon is visibly indicated to the user. If this identified target/drop icon is the intended destination of the dragging operation, the user has the option to select that target icon. If this selection is made, it is detected and the method of the present invention immediately drops the moving/drag icon into the target icon location thereby completing the drag and drop operation. If during the movement of the dragged icon, the movement of the drag icon deviates from the predicted path at the point of the deviation, the present invention detects the deviation and calculates a new predicted path. If during the movement of the dragged icon, it passes the identified target icon location before selecting that target icon, then the present invention also detects the deviation and calculates a new predicted path. This method also identifies the closest icon to the newly predicted path. This identified icon would become the new target icon.

DETAILED DESCRIPTION OF THE INVENTION

The present invention provides a method and system to predict locations during a drag and drop operation. With this invention, a user could execute a drag and drop operation without the need to drag the icon completely to the drop location. This step of this invention enables a user to interact with the computing screen that contains various desktop icons.

Figure 1:
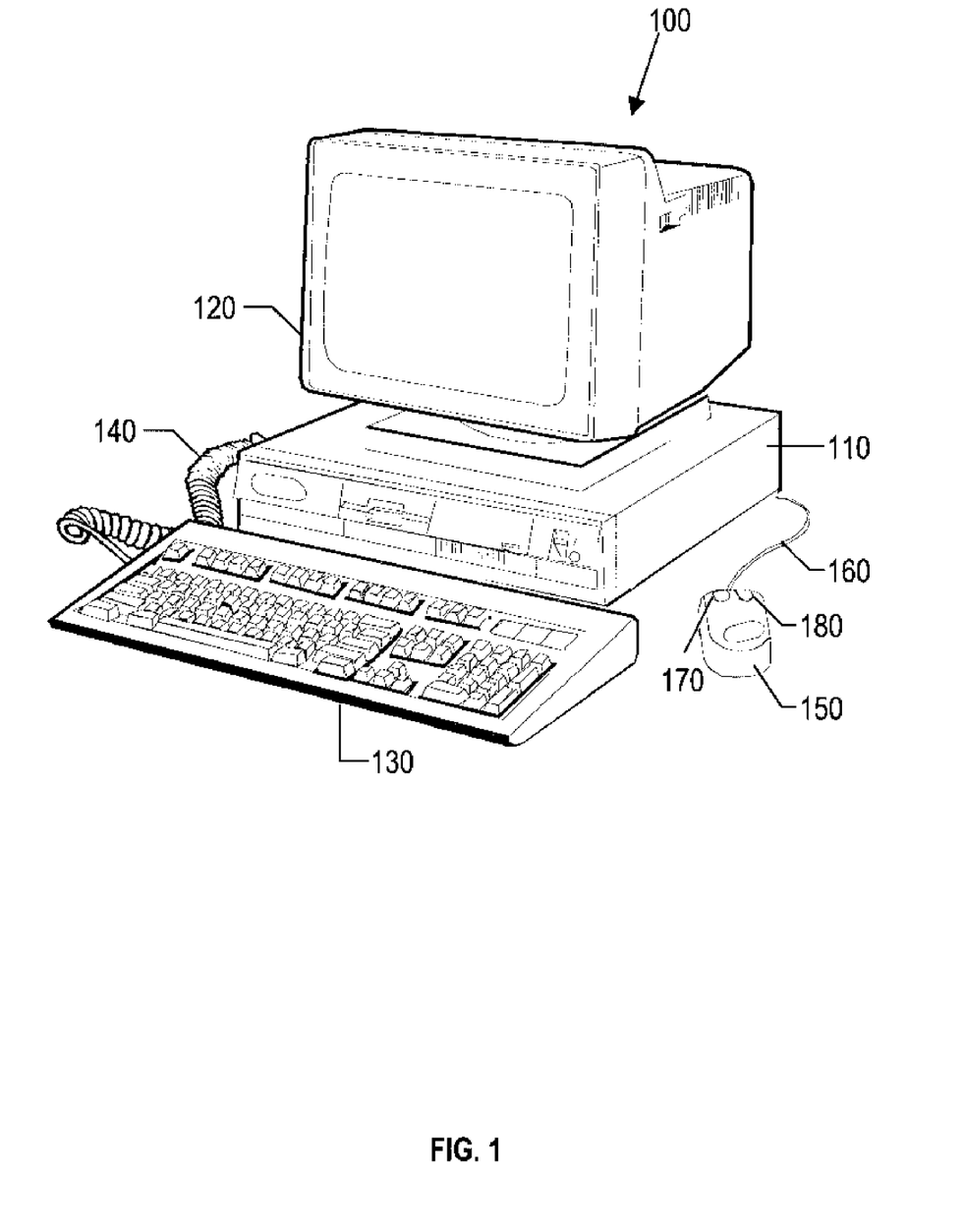
FIG. 1 is a pictorial representation of a personal computing device, which may be used in implementation of the present invention.

The device used to display the icons is a computing device similar to the device illustrated in FIG. 1. Shown in FIG. 1 is a pictorial representation of computing device 100 which may be used in implementation of the present invention. Although the invention is described in terms of the device illustrated in FIG. 1, other types of electronic devices capable of transmitting and receiving information can be used in the implementation of the present invention. As seen in FIG. 1, data processing system 100 includes processor 110 that preferably includes a graphics processor, memory device and central processor (not shown). Coupled to processor 110 is video display 120 which may be implemented utilizing either a color or monochromatic monitor, in a manner well known in the art. Also coupled to processor 110 is keyboard 130. Keyboard 130 preferably comprises a standard computer keyboard, which is coupled to the processor by means of cable 140. Also coupled to processor 110 is a graphical pointing device, such as mouse 150. Mouse 150 is coupled to processor 110, in a manner well known in the art, via cable 160. As is shown, mouse 150 may include left button 170, and right button 180, each of which may be depressed, or "clicked", to provide command and control signals to data processing system 100. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 100 may be implemented utilizing a personal computer.

Figure 2A:
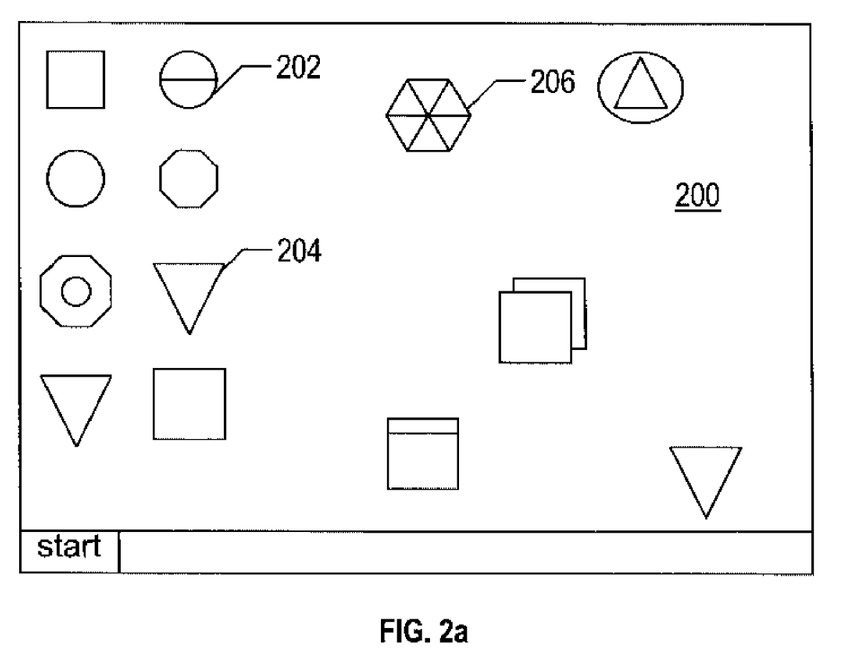
FIG. 2a is a view of a typical display desktop screen of a computing device having multiple icons.

FIG. 2a is a computer display screen 200 containing multiple computer icons such as 202, 204 and 206. On typical computer displays, a computer icon is a small pictogram. An icon is an operation picture that correlates to an operation of a computer. Modern computers now can handle bitmapped graphics on the display terminal, so the icons are widely implemented to assist users. Icons may represent a file, folder, application or device on a computer operating system. In modern usage today, the icon can represent anything that the users want it to: any macro command or process, mood-signaling, or any other indicator. User friendliness also demands error-free operation, where the icons are distinct from each other, self explanatory, and easily visible under all possible user setups.

Figure 2B:
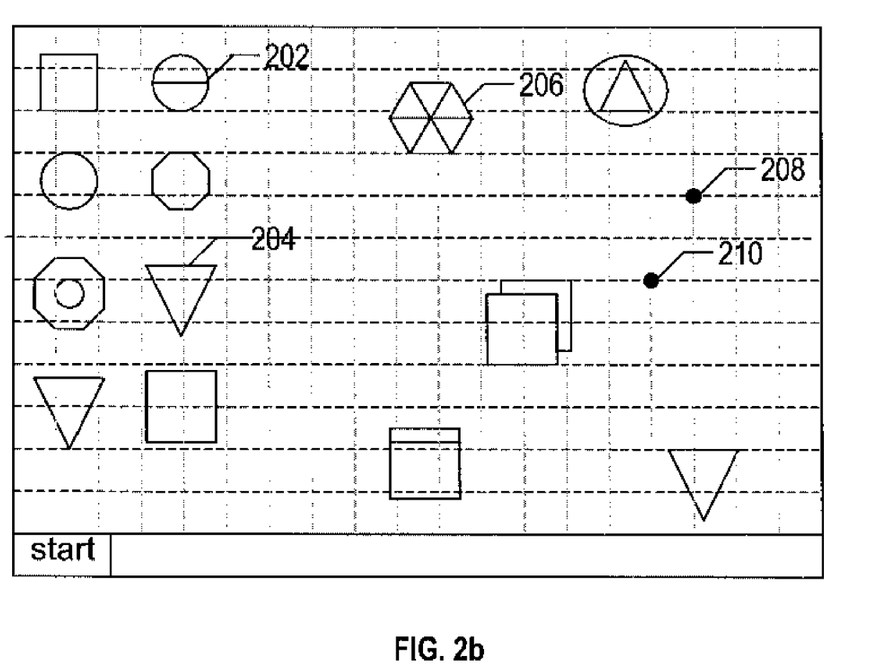
FIG. 2b is a view of a desktop screen of a computing device showing a grid with coordinates that identify specific locations of icons on the desktop screen.

FIG. 2b illustrates icons on a computer screen with a grid background. This grid facilitates the ability to identify a specific location of an icon on the screen. Points 208 and 210 indicate specific coordinates on the grid. In this approach, the location of each icon can be determined based on grid coordinates.

Figure 3:
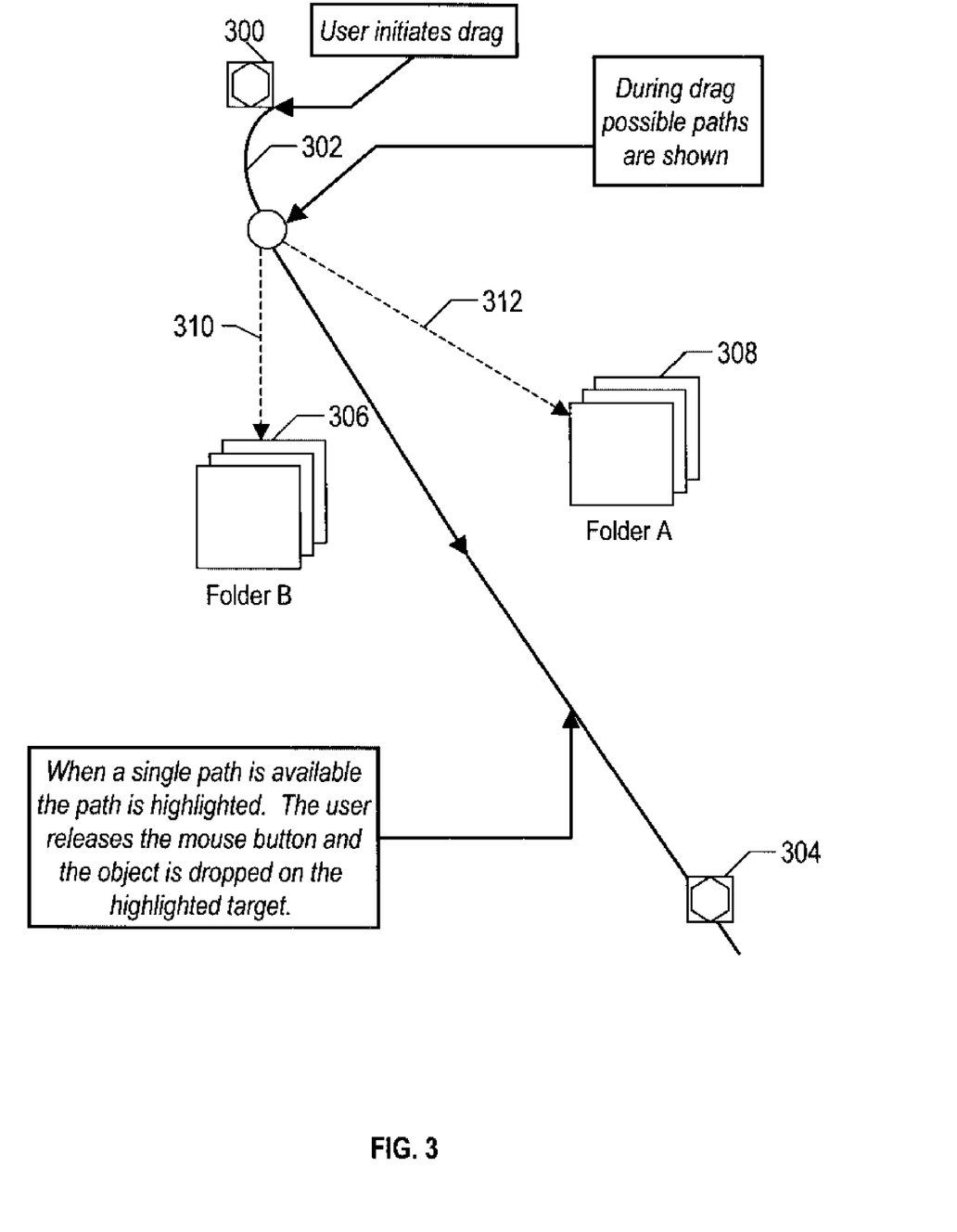
FIG. 3 is a general illustration of the concept of the present invention.

FIG. 3 is an illustration of the concept of the present invention. In this concept, a user wants to drag a "My file" icon 300. When the movement of the icon begins, the present invention can initially track the icon movement. From the initial movements of the icon 300, there can be a calculation of a projective path 302 of movement for the icon. From this projected path, there can be prediction a drop icon 304. The prediction of the drop icon can be based on the icon that is closest to the projected path 302. In determining the projected path of a moving or drag icon, the present invention can store information about the initial icon movement and identify a pattern of movement from this information. From this pattern, there can be a projection of future icon movement, which is the projected path. The grid coordinates can be used to identify a particular movement pattern. The predicted drop icon can be based on an icon that is foremost in or closest to the projected path.

As shown, even though there is primary projected target or drop icon, there can be multiple icons 306 and 308 that are approximately the same distance from the projected path 302. As the user moves the drag icon along the projected path 302, the user could easily select an icon that is in close proximity to the projected path. This approximate distance can be within an established threshold distance from the projected path. Any icon that is in this threshold distance of the projected path could be a potential target or drop icon. In the situation of multiple icons, the present invention can indicate alternate projected paths 310 and 312 in addition to the projected path 302. The indication of the alternate paths, done with dotted lines from the drag icon to the multiple icons in FIG. 3, alerts the user to other possible icon destinations. Further, if the user desires to drop the drag icon at icon 306 Folder B, the user could deviate from the projected path 302 to path 310. This change of direction of the drop icon would cause the path to Folder B to become the primary projected path. Folder B could be illuminated or highlighted as the new target icon. At this point, if icon 306 is the desired drop icon, the user has the option to immediately select that icon before the drag icon reaches that drop icon location. However, if the drop icon moves passed the paths for icons 306 and 308 without deviation, drop icon 304 can remain highlighted as the primary icon. As with icon 306, when this icon is highlighted, at that point, the user has the option to select that icon before the drag icon 300 reaches the drop icon location.

Figure 4:
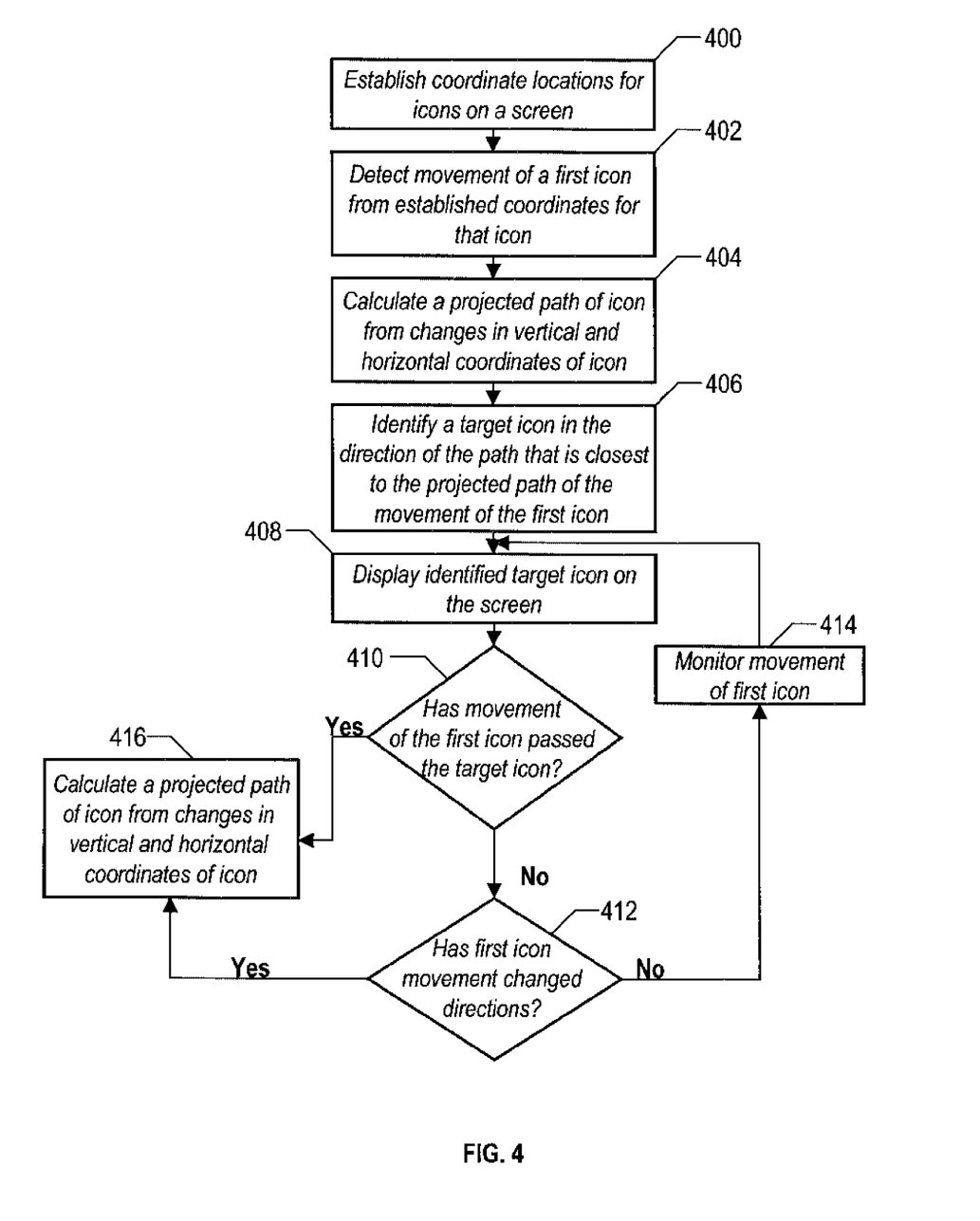
FIG. 4 is a flow diagram of the general steps in the implementation of the method of the present invention.

FIG. 4 shows a general description of the method of the present invention. An initial step 400 can be to establish coordinate location for icons on a display screen. These coordinates can be used in determining the direction of icon movement. The coordinates of each icon can be temporarily stored in a memory location that is linked to the display screen. The current position of the icons can be constantly monitored. Step 402 would detect any movement of an icon. As the icon moves passed at least coordinate points, step 404 can begin to calculate a projected path for the icon. The calculations would result from changes in the horizontal and vertical coordinates. The pattern of coordinate changes is used to predict the path for movement of the icon. With predicted path of movement, step 406 can identify any icons that are closest to the projected path of the moving icon. These icons are target icons. This identification of target icons can be based on the proximity of the icon coordinates to the coordinates of the projected moving icon path. Step 408 would distinctively display the closest icon on the screen. This display could be by illuminating the target icon.

As the drag icon moves across the screen, it is possible for the drag icon to move passed the target icon or for the drag icon to deviate from the projected path. During the movement of the drag icon, the present invention monitors this icon movement. As part of this monitoring, step 410 makes a determination of whether the drag icon has moved passed the target icon location. If the determination is that the drag icon has not moved passed the target icon, step 412 makes a determination of whether the drag icon movement has deviated from the previously projected path. In some cases, the drag icon may move toward an icon that is not the projected target icon. If the movement of the drag icon is still on the initially projected path, at this point, the method continues to monitor the movement of the drag icon in step 414. At this point, the method continues to monitor the movement of the drag icon and returns to step 408.

Referring back to step 410, if the determination is that the drag icon has moved passed the target icon, then the method moves to step 416, which calculates a new projected path for the drag icon. When the drag icon moves passed the target icon, the process of calculating a new target icon in step 416 would be similar to the process in step 404. After the calculation of a new projected path in step 416, the method moves to step 406.

As previously mentioned, in step 410 if the determination is that the drag icon has not moved passed target icon, then the method moves to step 412 which makes a determination of whether the drag icon has changed directions. If the determination is that the drag icon has changed directions, then the method moves from step 412 to step 416, which calculates a new projected path for the drag icon. This process of FIG. 4 continues until there is an identified target icon and the drag icon is dropped in the target icon.

Figure 5:
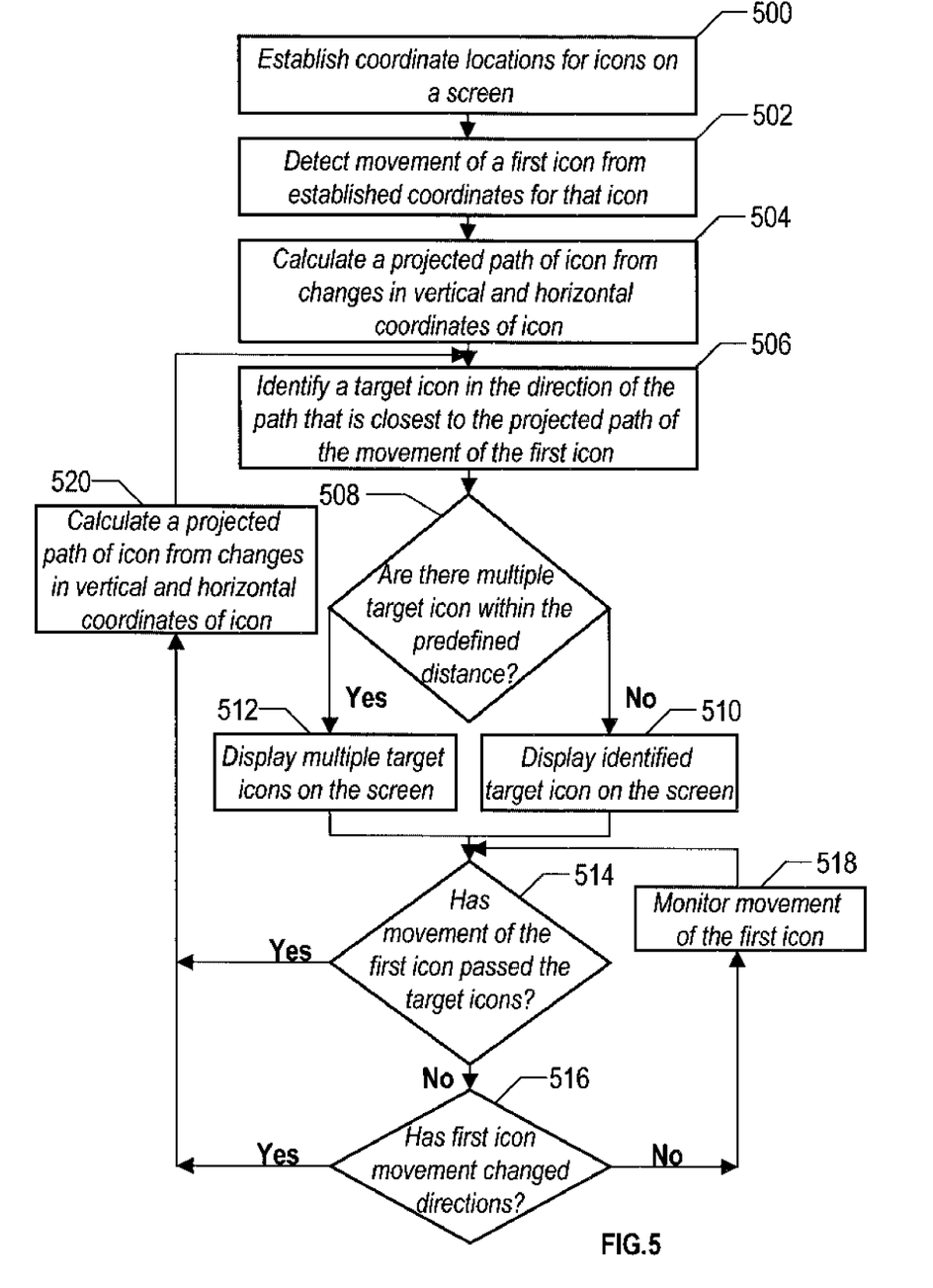
FIG. 5 is a flow diagram of the implementation of the method of the present invention when multiple target icons are identified.

FIG. 5 is a flow diagram of the present invention when multiple target icons are identified. As shown in FIG. 3, there can be multiple icons 306 and 308 that are in close proximity to the projected movement of the drag icon. In the method illustrated in FIG. 5, steps 500, 502, 504 and 506 are similar steps 400, 402, 404 and 406 of FIG. 4. Step 508 makes a determination of multiple icons within a certain distance of the projected path of the drag icon. In this process, icons in the general direction of the projected path would be examined to determine whether the icon is within the defined or threshold distance of the projected path. If the icon were within this distance, the icon would be one of the target icons. If in step 508, there is a determination there are not multiple target icons, then the method moves to step 510, which displays an identified target icon on the screen similar to FIG. 4. If the determination in step 508 is that there are multiple target icons, then step 512 displays the target icons on the screen. This display could include highlighted paths to each target icon. The target icons can also be distinctly displayed to the user in some special manner, different from the normal display of icons. Once the method has displayed the icons, the method moves to step 514 which makes a determination of whether the drag icon has moved passed the target icons. Similar to step 410, if the determination in step 514 is that the drag icon has not moved passed the target icon, step 516 makes a determination of whether the drag icon movement has deviated from the previously projected path. If the movement of the drag icon is still on the initially projected path, at this point, the method continues to monitor the movement of the drag icon in step 518. At this point, the method continues to monitor the movement of the drag icon and returns to step 514.

Referring back to step 514, if the determination is that the drag icon has moved passed the target icon, then the method moves to step 520, which calculates a new projected path for the drag icon. When the drag icon moves passed the target icons, the process of calculating a new target icon in step 520. After the calculation of a new projected path in step 520, the method moves to step 506.

As previously mentioned, in step 514 if the determination is that the drag icon has not moved passed target icon, then the method moves to step 516 which makes a determination of whether the drag icon has changed directions. If the determination is that the drag icon has changed directions, then the method moves from step 516 to step 520, which calculates a new projected path for the drag icon. This process of FIG. 5 continues until there is an identified target icon and the drag icon is dropped in the target icon.

Figure 6:
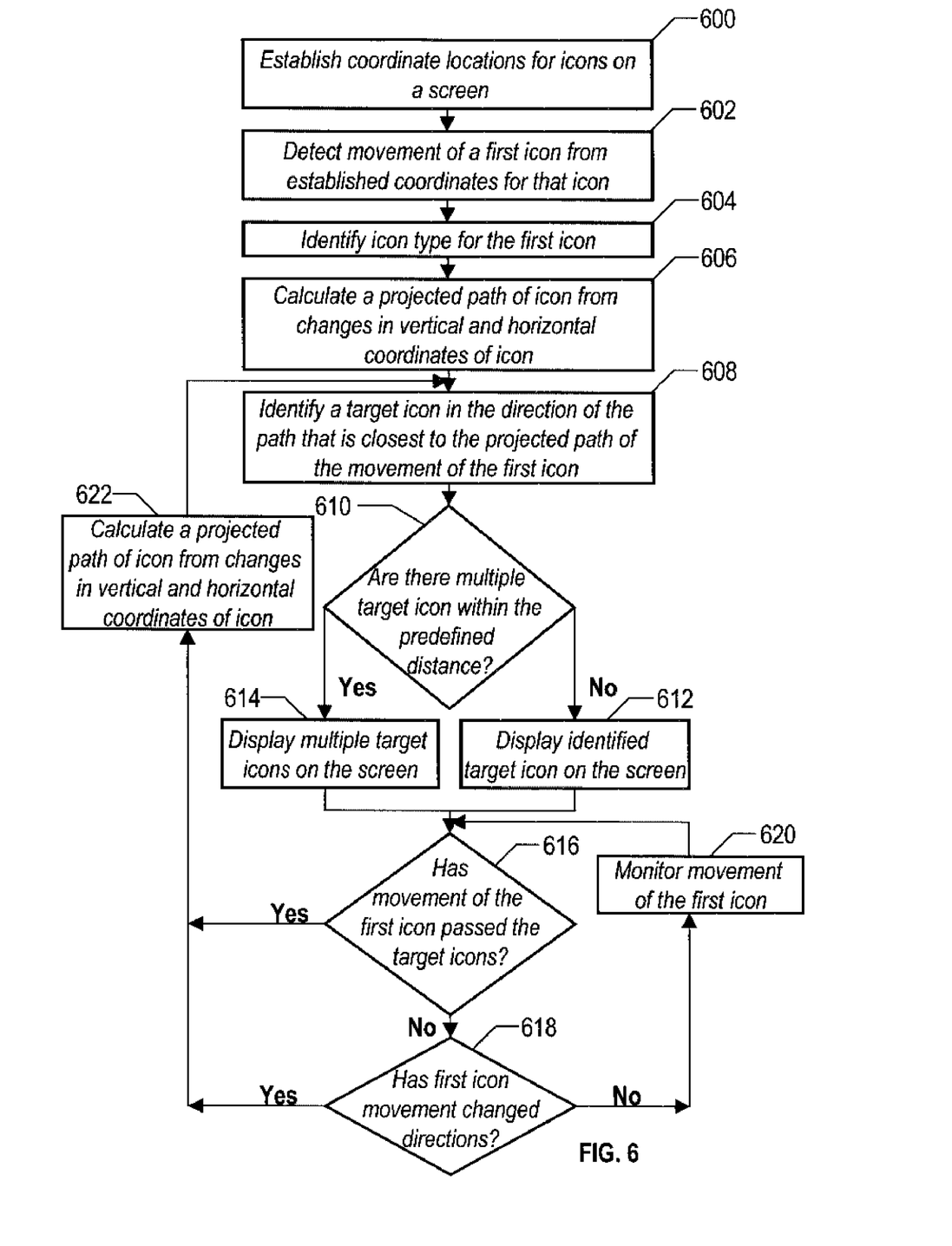
FIG. 6 is a flow diagram of the implementation of the method of the present invention that identifies the icon type of the dragging icon.

FIG. 6 shows an embodiment of the method of the present invention, which identifies the type of drop icon and a target icon of a comparable type to the drop icon. This identity could be of the icon such as folder or file. For example, in some situations, a WORD file is on the desktop. When an icon is placed on the desktop, the information about the icon and related program can be recorded in the previously mentioned index along with the coordinate location of the icon on the desktop.

As with previous embodiments, an initial step 600 can be to establish coordinate location for icons on a display screen, which can be used in determining the direction of icon movement. The current position of the icons can be constantly monitored. Step 602 detects movement of an icon. An icon moved for the purpose of dropping it into another icon is a drag icon. Step 604 identifies the type of drag icon. As the icon moves passed at least one set of coordinate points, step 606 calculates a projected path for the drag icon. With predicted path of movement, step 608 can identify any icons that are closest to the projected path of the moving icon that is of the same or similar type to the drag icon. This icon is target icon.

Step 610 makes a determination of multiple icons within a certain distance of the projected path of the drag icon. These icons would be of the same or similar type to the drag icon. As in FIG. 5, in this process, icons in the general direction of the projected path would be examined to determine whether the icon is within the defined or threshold distance of the projected path. If the icon were within this distance, the icon would be one of the target icons. If in step 610, there is a determination there are not multiple target icons, then the method moves to step 612, which displays an identified target icon on the screen similar to FIG. 5. If the determination in step 610 is that there are multiple target icons, then step 614 displays the target icons on the screen. This display could include highlighted paths to each target icon. The target icons can also be distinctly displayed to the user in some special manner. Once the method has displayed the icons, the method moves to step 616 which makes a determination of whether the drag icon has moved passed the target icons. Similar to step 514, if the determination in step 616 is that the drag icon has not moved passed the target icon, step 618 makes a determination of whether the drag icon movement has deviated from the previously projected path. If the movement of the drag icon is still on the initially projected path, at this point, the method continues to monitor the movement of the drag icon in step 620. At this point the method continues to monitor the movement of the drag icon and returns to step 616.

In step 616 if the determination is that the drag icon has not moved passed target icon, then the method moves to step 618 which makes a determination of whether the drag icon has changed directions. If the determination is that the drag icon has changed directions, then the method moves from step 618 to step 622, which calculates a new projected path for the drag icon.

Figure 7:
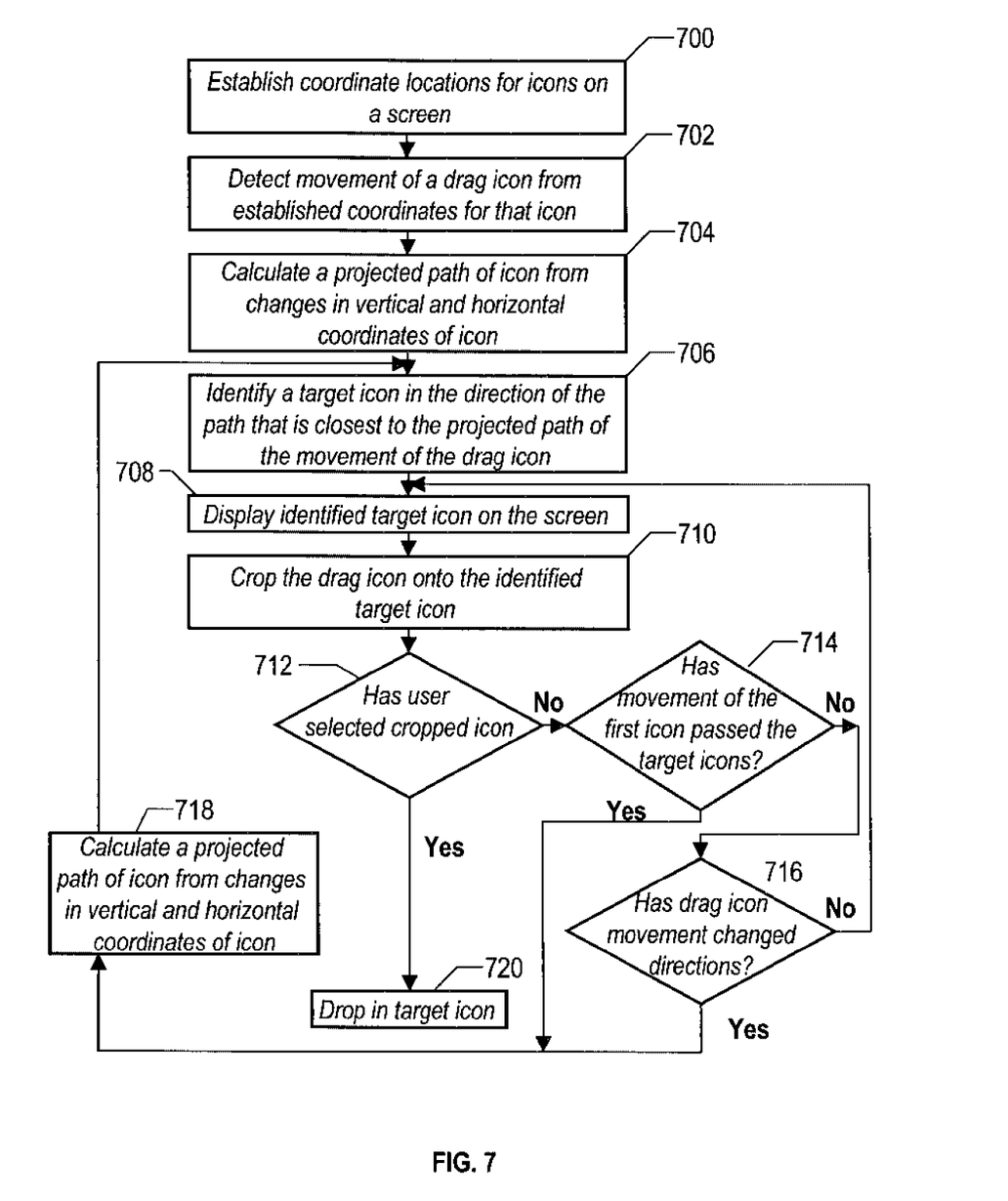
FIG. 7 is a flow diagram of the implementation of the method of the present invention that crops the dragging icon onto a target icon.

FIG. 7 describes an embodiment of the present invention that crops the drag icon onto the target icon. In this embodiment in addition to identifying and highlighting a target icon, the drag icon is cropped onto the target icon. If this target icon is the intended location to drop the drag icon, the user simply needs to release the mouse to complete the drop operation. FIG. 7 is a flow diagram of an embodiment of the method of the present invention that crops a target icon and gives a user the option to drag and drop an icon to the target icon. In the method illustrated in FIG. 7, steps 700, 702, 704, 706 and 708 are similar steps 400, 402, 404, 406 and 408 of FIG. 4. Step 710 crops the drag icon onto the target icon. This act eliminates the need for the user to continue to drag the icon to the target icon location. If the predicted target icon is accurate, then the user could immediately release the mouse to drop the drag icon into the target icon.

In this method, step 712 determines whether the user has selected the cropped icon. If the user has selected the cropped icon, then the drag icon is dropped into the target icon in step 720. If the user did not select the cropped icon, then the method moves to step 714 which makes a determination of whether the drag icon has moved passed the cropped target icon. If the determination in step 714 is that the drag icon has not moved passed the target icon, step 716 makes a determination of whether the drag icon movement has deviated from the previously projected path. If the movement of the drag icon is still on the initially projected path, then the method continues to monitor the movement of the drag icon and returns to step 708.

In step 714 if the determination is that the drag icon has not moved passed target icon, then the method moves to step 716 which makes a determination of whether the drag icon has changed directions. If the determination is that the drag icon has changed directions, then the method moves from step 716 to step 718, which calculates a new projected path for the drag icon.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for predictive drag and drop operations to improve accessibility comprising:
   displaying a plurality of icons on a display screen;
   detecting the movement of an icon, this icon being a drag icon;
   tracking movement of the drag icon;
   generating a projected path for the drag icon based on initial movement of the icon;
   identifying an icon located in the projected path of the drag icon, this icon being the first target icon; and
   displaying the identified target first icon in the projected path such that the first target icon becomes distinctly displayed on the display screen; and
   displaying a path from the drag icon to the first target icons.

2. The method as described in claim 1 further comprising after said displaying step, the step of querying a user to determine whether the user desires to select the first target icon as a drop location for the drag icon.

3. The method as described in claim 1 further comprising after said identifying step, the steps of:
   identifying icons that are within a predefined distance of the projected path;
   displaying these icons on the screen in a manner that makes the icons conspicuous to a user; and
   displaying a path from the drag icon to each of the identified icons.

4. The method as described in claim 1 further comprising the steps of; monitoring the movement of the drag icon; and detecting when the path of the drag icon passes the first target icon.

5. The method as described in claim 4 further comprising the step of calculating a new projected path for the drag icon to a second target icon based on the previous movement of the icon.

6. The method as described in claim 4 further comprising when there is a determination that the movement of the target icon has not passed the first target icon, the step of determining whether movement of the drag icon has deviated from the projected path.

7. The method as described in claim 1 further comprising after said detecting step, the step of identifying an icon type of the drag icon.

8. The method as described in claim 1 further comprising after said displaying step, the step of cropping the drag icon onto said first target icon.

9. The method as described in claim 1 wherein said displaying of the first target icon is by illuminating the first target icon.

10. The method as described in claim 3 wherein said icon displaying step further comprises displaying a line from the drag icon to each of the identified icons.

11. The method as described in claim 1 wherein said step of generating a projected path for the drag icon further comprises identifying a pattern of movement of the drag icon and projecting and displaying projected future movement of the drag icon based on the identified pattern.

12. A system for predictive drag and drop operations to improve accessibility, comprising:
   a display screen for displaying two or more operation pictures on a display screen, each of said operation pictures being correlated to an operation of a computer;
   pointer for engaging and moving an icon across the display screen and for depositing the moving icon in a location of target icon on the display screen;
   module for detecting the movement of an icon, tracking this movement, calculating a pattern of movement and generating and displaying a projected path of movement of the icon based on the calculated pattern of movement; and a module for identifying a target icon that is within a define distance from the projected path of the moving icon and distinctly displaying the identified target icon on the display screen in a special manner different from the normal display of icons.

13. A computer program product stored in a non-transitory computer readable storage medium for predictive drag and drop operations to improve accessibility comprising:

instructions displaying a plurality of icons on a computing screen;

instructions detecting the movement of an icon, this icon being a drag icon;

instructions tracking movement of the drag icon;

instructions generating a projected path for the drag icon based on initial movement of the icon;

instructions identifying an icon located in the projected path of the drag icon, this icon being the first target icon; and instructions displaying the identified target icon in the projected path such that the identified icon becomes conspicuous on the display screen; and instructions displaying a path from the drag icon to the first target icons.

14. The computer program product as described in claim 13 further comprising after said identifying instructions: instructions identifying icons that are within a predefined distance of the projected path; and instructions displaying these icons on the screen in a manner that makes the icons conspicuous to a user.

15. The computer program product as described in claim 13 further comprising: instructions monitoring the movement of the drag icon; and instructions detecting when the path of the drag icon passes the first target icon.

16. The computer program product as described in claim 15 further comprising instructions calculating a new projected path for the drag icon to a second target icon based on the previous movement of the icon.

17. The computer program product as described in claim 15 further comprising when there is a determination that the movement of the target icon has not passed the first target icon, instructions determining whether movement of the drag icon has deviated from the projected path.

18. The computer program product as described in claim 13 wherein said instructions generating a projected path for the drag icon further comprises instructions identifying a pattern of movement of the drag icon and projecting future movement of the drag icon based on the identified pattern.

* * * * *